Patented Aug. 25, 1953

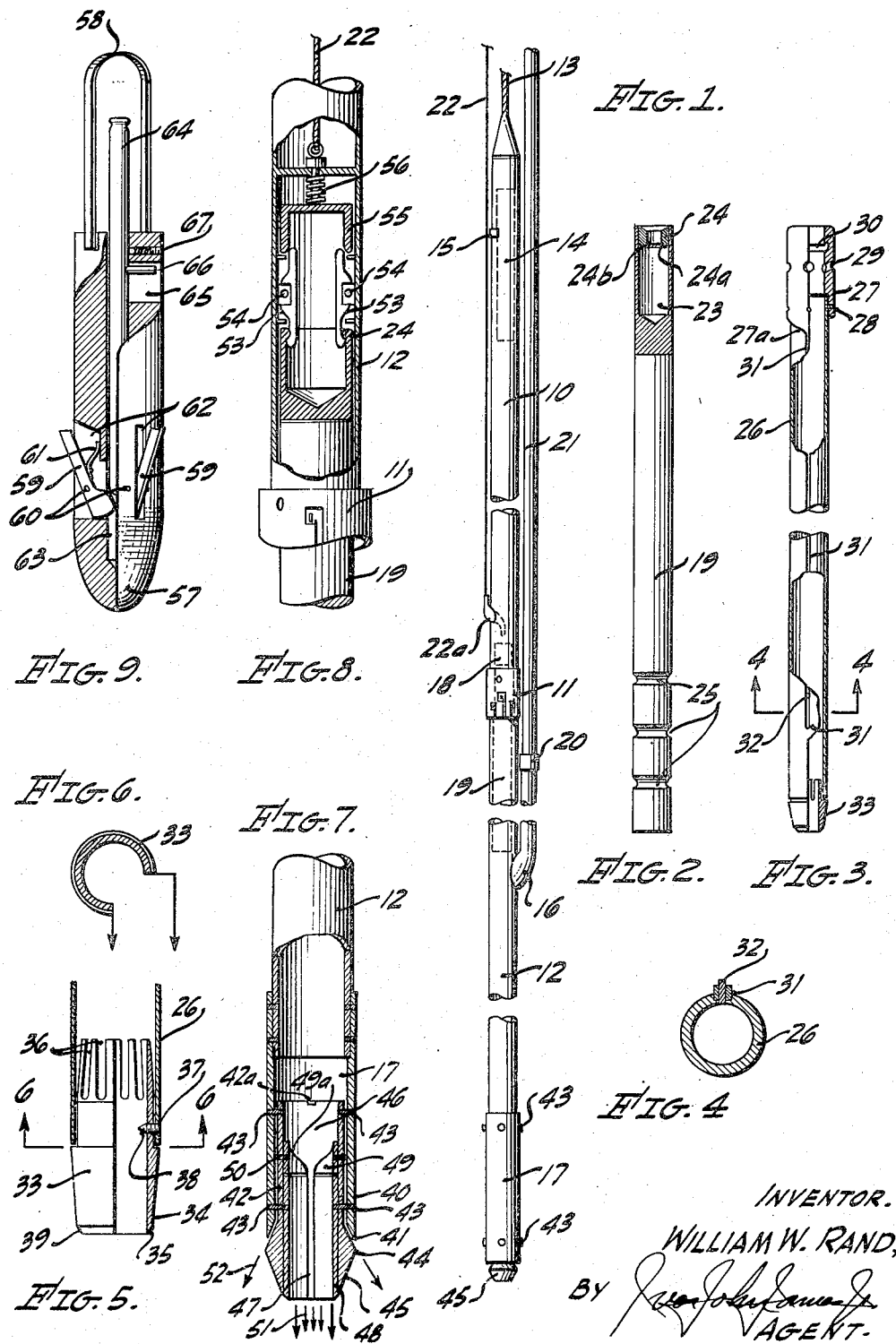

2,650,069

UNITED STATES PATENT OFFICE 2,650,069

SUBMARINE CORE SAMPLING

William W. Rand, Santa Barbara, Calif., assignor to Union Oil Company of California, Los Angeles, Calif., a corporation of California Application September 23, 1949, Serial No. 117,337

12 Claims. (Cl. 255—1.4)

This invention relates to a method and apparatus for obtaining core samples such as those utilized in prospecting for valuable subsurface deposits of ore, oil, gas, sulfur, and the like, and is particularly directed to a method and apparatus for obtaining such samples from earth formations lying below bodies of water.

The taking of samples of earth formations and subsequent analysis of such samples permit the determination of the nature, the extent and the constitution of a particular region of the earth's crust and are of material assistance in locating valuable bodies of mineral matter or other materials located therein. Deposits of oil and gas are often found to exist in certain regions in which the geologic formations of the earth's crust usually have particularly characteristic properties. In the search for crude petroleum, subsurface formations having these known properties are located and the determination of whether or not they contain crude petroleum is made by drilling a test well. One particularly characteristic formation in which crude petroleum frequently occurs is known as an anticline in which the sedimentary bedding planes rise to a maximum level and then fall. Should such an anticline be covered by an impervious layer of material such as hard rock, accumulations of petroleum, and other similar materials are frequently found within such a geologic structure. By obtaining core samples of sedimentary or other types of formations and measuring the inclination of the bedding planes, the presence or absence of an anticline type of structure may be determined.

The present invention is very effective for obtaining samples of submarine geologic strata which are not only submerged beneath marine bodies but are found covered by considerable layers of sand, silt, gravel and the like which are herein referred to collectively as the overburden. The presence of such overburden makes the conventional methods of obtaining core samples extremely difficult. Such deposits of overburden are usually present covering the hard rock geologic formations near the shores of marine bodies of water and are frequently present in varying depths at points well beyond the normal tidelands. The depth of the overburden may range from a few feet to many hundreds of feet. The geologic significance as regards prospecting for petroleum or other mineral deposits of such overburden is relatively small. It is highly desirable therefore to obtain actual core samples of the geologic strata underlying the overburden.

It is therefore a primary object of the present invention to provide a method for the obtaining of samples of submarine rock covered by bodies of fresh or salt water and considerable depths of overburden.

It is a further object of this invention to provide a method whereby the overburden covering the submarine geologic strata is penetrated by means of hydraulic jet thereby exposing the strata and a sample is taken by driving a core barrel into the strata.

It is another object of this invention to provide a method whereby core samples of submarine strata are obtained in a core barrel by a single impact of a separate weight.

Another object of this invention is to provide a method whereby core samples are cut from submarine geologic strata utilizing the kinetic energy of a weight driven by water pressure and gravity against a core receiving barrel.

It is another object of this invention to provide a method for surveying submarine geologic formations by core sampling the strata underlying the submarine overburden.

Another object of this invention is to provide an improved apparatus for obtaining samples of submarine geologic strata covered by considerable depths of overburden.

Other objects and advantages of the present invention will become apparent to those skilled in the art as the description thereof proceeds.

The present invention comprises a process and an apparatus by means of which the overburden is easily penetrated and a clean core sample of the underlying geologic strata is obtained. The penetration of the overburden is obtained by hydraulically displacing silt by means of a jet of high pressure water and continuously lowering the sampling tube emitting the jet through the hole thus formed in the overburden. By the use of a specially designed hydraulic jet a clean substantially vertical hole of considerably larger diameter than the sampling tube is obtained and the upward flow of water through the hole thus formed prevents the refilling of the hole with displaced overburden. Upon complete penetration of the overburden which is indicated by characteristic sounds transmitted up the suspension cable, a weight within the sampling tube is released which by the force of gravity and the existing force of high pressure water is driven as a piston against the core barrel suspended within the sampling tube thus driving the core barrel with a single impact into the exposed geologic strata and cutting a core sample therefrom and simultaneously cutting a longitudinal scribe on the core. Following the penetration of the strata, the amount of inclination of the core barrel, the azimuth of the inclination and the azimuth of the scribe mark on the core sample are recorded so that the position of the core relative to the geographic directions may be established. The core barrel is provided with a means for scribing the core longitudinally as it is received into the core barrel upon penetration. A known rotative relation is thereby maintained between the core and the core barrel. A similar relation is maintained between the core barrel and the sampling tube. This permits a direct determination of the dip and strike of the bedding planes usually found in the core sample from inclination and azimuth of the core and the azimuth of the scribe mark on the core.

The method of the present invention has been developed to a point where 20 to 30 submarine core samples per day may be obtained in depths of water as deep as 50 fathoms. Furthermore, excellent core samples have been obtained by this method in deep water from geologic strata covered with a hundred feet or more of overburden. The customary length of core averages between 1 foot and 2 feet, but cores as long as 3 feet have been obtained. The diameter of the core samples is customarily around 1.5 inches. The condition of the samples thus obtained has been highly satisfactory permitting accurate determinations of desired data for the geologic strata from which they were taken.

The method and apparatus of this invention may be more clearly understood by reference to the accompanying drawings in which:

Figure 1 is a general elevation view of the assembled core sampling device preparatory to taking a core sample, Figure 2 is an elevation view in partial cross section of the drop weight employed to drive the sampling tube into submarine strata, Figure 3 is an elevation view in partial cross section of the core barrel provided with a cutting head by means of which the core is cut from the formation, Figure 4 is a horizontal cross section of the core barrel, Figure 5 is a detailed elevation of the core cutting head showing the scriber and core-retaining fingers, Figure 6 is a horizontal cross section of the core head, Figure 7 is an elevation view in cross section of the jetting head by means of which the hole through overburden is cut, Figure 8 is an elevation view in cross section of the releasing device for dropping the driving weight within the sampling tube, and Figure 9 is an elevation view in partial cross section of the device employed to remove the drop weight and the core barrel containing the core sample from the sampling tube after the sample has been taken and the device hauled to the surface.

Referring now more particularly to Figure 1 the sampling device consists of upper sampling tube 10 joined by quick breaking joint 11 which is covered by a collar, not shown, to prevent the spreading of joint 11 under the stress of a non-longitudinal pull to lower sampling tube 12, the latter hereinafter called the sampling tube. A suspension cable 13 is provided by means of which the entire device is lowered from a vessel on the surface of the marine body. Upper sampling tube 10 consists of an elongated cylindrical pipe, preferably made of brass, Monel metal or other relatively nonmagnetic metal. A recording device 14 containing a magnetic compass, an inclination indicating device and a camera is inserted within upper sampling tube 10 and secured in a known rotative relationship thereto by means of set screw 15. Sampling tube 12 is also an elongated cylindrical tube, preferably fabricated of steel, and is provided with jetting fluid inlet 16 intermediate its ends. The lower portion of sampling tube 12 is provided with jetting head 17, which will be subsequently described in connection with Figure 7. Upper sampling tube 10 is provided with weight release device 18 by means of which drop weight 19 is suspended in such a way that its lower extremity is above the inlet point where fluid inlet 16 opens into sampling tube 12. Release device 18 is provided with nonmagnetic wire release line 22 which also connects the sampling device through guide tube 22a with the survey vessel and by means of which at any desired time drop weight 19 may be released when the core sample is to be taken. The release device 18 will be subsequently described in more detail in connection with Figure 8.

Jet fluid inlet 16 is coupled by coupling 20 to high pressure hose 21 which runs to the surface for connection to the discharge outlet of a high pressure water pump carried aboard the surveying vessel. Below inlet 16 and within sampling tube 12 is suspended a core receiving barrel not shown but described in more detail in connection with Figure 3 and Figure 4. Drop weight 19 fits closely with small clearances within sampling tube 12. Clearances of about $\frac{3}{32}$ of an inch have been found adequate. Such a clearance is ample to permit an adequate flow of jet water through the annular space around the drop weight so as to maintain the hole through the overburden open and still are small enough, however, to cause the jet fluid to exert a considerable driving force against the drop weight as a piston once it has fallen past the jet fluid inlet 16 after its release. In this manner the total kinetic energy necessary to cut the core from the formation is obtained by the combined action of gravity and the jet fluid pressure. A considerable decrease is obtained in the required length of sampling device from that which would ordinarily be necessary if the entire energy were to be obtained by gravitation alone.

During operation of this device for obtaining a core sample, the core barrel is suspended in the sampling tube well below the jet fluid inlet and the drop weight is suspended therein above the jet water inlet. The entire device is lowered overboard with a high pressure pump aboard the vessel supplying water to the sampling tube and a heavy jet of water issuing downwardly from the jetting head. Upon reaching the overburden, the jet hydraulically displaces the silt and sand thereby cutting a substantially vertical hole through which the entire device is lowered as fast as formed. When the submarine geologic strata below the overburden is exposed the weight release is actuated and, without discontinuing the flow of the jet water, the drop weight is released and projected with a single sharp impact against the core barrel driving it a considerable distance into the geological strata and cutting a core sample therefrom. At this time recording means 14 is actuated whereby the inclination of the device and the azimuth of the inclination, and also the azimuth of the scribe mark on the core are recorded. The entire device is then withdrawn from the hole and is hauled to the surface.

Upon reaching the surface quick breaking joint 11 is separated and by using the device shown in Figure 9, first the drop weight and then the core barrel is removed from lower sampling tube 12. A new core barrel is inserted in the sampling tube, the drop weight resuspended at its former position, quick breaking joint 11 is reassembled and the device lowered over the side for the taking of a subsequent sample.

The core is scribed to maintain a known rotative relation between it and the core barrel, a known relation is maintained between the core barrel and the sampling tube, and the rotative relation between the sampling tube and the recorder device is fixed so that from the record of the inclination and the azimuths of the scribe mark on the core sample the geometry of the core with respect to the strata sampled is known.

Referring now more particularly to Figure 2 drop weight 19 is shown with its upper extremity drilled out forming opening 23. At the upper end of this opening is retaining ring 24 provided with two bevelled lower surfaces 24a of about 20° and 24b of about 30°. Surface 24a engages fingers 53 of Figure 8 for suspension of drop weight 19 while surface 24b engages members 59 of Figure 9 for removal of the weight from the sample tube. If desired, grooves 25 may be provided around drop weight 19 in order to increase the pressure drop of jet fluid flowing through the annular space between the weight and lower sampling tube 12 thereby increasing the kinetic energy obtainable from the action of the jet water introduced in the manner of a turbine.

In one modification of the device of the present invention a drop weight consisting of a cold rolled round steel bar 11 feet in length and 2½ inches in diameter was used in connection with such core sampling operations in which 350 feet per square inch jet water pressure (at the surface) was used. With higher water pressures smaller drop weights are in order.

Referring now particularly to Figure 3, a cross-sectional view of the core receiving barrel is shown which is suspended in the lower portion of sampling tube 12 and in the jetting shoe prior to being driven by a single impact of the drop weight into the formation to be sampled. Figure 4 is a cross sectional view of the core barrel and will be described simultaneously with Figure 3. Core barrel 26 is provided at its upper extremity with a hollow driving head 27 which is attached by means of four flush machine screws 28. This driving head is further provided with water escape ports 29. Driving head 27 is further provided with inner groove 30 by means of which the apparatus shown in Figure 9 is connected thereto to permit removal of the core barrel and core sample from the sampling tube. Core barrel 26 is further provided with longitudinal key 31 setting in a longitudinal keyway milled into core barrel 26. The longitudinal key rides in a keyway provided in the inner surface of jetting head 17 and maintains a known rotative relation between core barrel 26 and sampling tube 12. Near the lower extremity of key 31 and extending both through the key and the wall of core barrel 26 is provided shear pin 32. The shear pin may be fabricated of aluminum, copper or other soft shearable metal and is provided for the purpose of supporting core barrel 26 in the lower portion of sampling tube 12 prior to the impact of drop weight 19. At the lower extremity of core barrel 26 is provided core cutting head 33 which is fully described in connection with Figures 5 and 6. Core barrel 26 is prevented from passing completely out the bottom of sampling tube 12 by means of driving head 27, which is of larger outside diameter than the inside diameter of inner cylindrical section 48 within jetting head 17 through which core barrel 26 slides and is provided with surface 27a which matches the curvature of surface 49a of guide collar 49.

Referring now to Figures 5 and 6, an elevation view of core cutting head 33 in partial cross section is shown in Figure 5 and a horizontal cross section in Figure 6. Core cutting head 33 is cylindrical and is provided at its lower part with double downward inwardly beveled surfaces 34 and 35. At its upper part the cylindrical core cutting head is turned down to a smaller outside diameter to fit rather tightly into the lower extremity of core barrel 26. Core head 33 is further provided at its upper part with core retaining fingers 36 which are bent slightly inward and which prevent the core from sliding out of the core barrel after the sample is taken. The core head is attached to core barrel 26 by means of screw 37 which is provided with inner scribing point 38. This scribing point makes a longitudinal scribe mark along the side of the core sample when it is taken and establishes a known rotative relation between the core sample and core barrel 26. Core head 33 is fabricated from cyanide - hardened chrome - molybdenum alloy steel. The angle with which lower bevel 35 makes with the horizontal is preferably between about 20° and 60°, although the best results have been found in which this angle is between about 30° and 40°. Furthermore, it is of considerable importance to have on the cutting edge 39 a flat surface of about ⅟₆₄ of an inch instead of a sharp cutting edge. When core heads fabricated according to the foregoing specifications are used in the core sampling process of this invention samples of the hardest known shales such as those of the Monterey type are successfully obtained without visual damage to the core cutting head.

Referring now to Figure 7, an elevation view in cross section of jetting head 17 provided at the lower extremity of sampling tube 12 is shown. Jetting head 17 is provided within outer cylindrical extension 40 of sampling tube 12, this extension being the outer casing of the jetting head assembly. The lower extremity of extension 40 is provided with a downward outwardly beveled edge 41. Within extension 40 is disposed inner cylindrical section 42 spaced from extension 40 by means of machine screws 43 leaving an annular space between section 42 and extension 40. On the upper edge of cylindrical section 42 is provided bearing surface 42a upon which shear pin 32 rests while the core barrel is suspended within sampling tube 12. Toward the lower extremity of inner cylindrical section 42 is provided an upper upward inwardly beveled surface 44 spaced approximately the same distance from beveled surface 41 as the annular distance between section 42 and extension 40. Below beveled surface 44 is provided lower downward inwardly beveled surface 45 which terminates at the lower end of jetting head 17. The annular space previously referred to continues through the annular space formed between beveled surfaces 41 and 44. This provides a passage through which a portion of the high pressure jet water passes forming a cone shape jet diverging downwardly. The amount of water thus passing constitutes the minor proportion of the entire quantity of water used in the jet while cutting through the overburden, the remaining major proportion passing downwardly through the suspended core barrel within sampling tube 12 and passing directly downwardly through the main inside channel 46 of jetting head 17.

Within cylindrical section 42 is provided keyway 47 which may be milled in guide cylinder 48 disposed within and integrally attached to inner cylindrical section 42 by means of the lower set of machine screws 43. Keyway 47 is adapted to receive key 31 set into core barrel 26 and to maintain a known rotative relation between core barrel 26 and sampling tube 12. Upon insertion of the core barrel 26 key 31 is guided into keyway 47 by means of guide collar 49 integrally attached to cylindrical section 42 by means of machine screws 50. The position of shear pin 32 with respect to the lower extremity of key 31 is such that after key 31 enters keyway 47 and moves downwardly therethrough a sufficient distance to bring the lower extremity of core head 33 adjacent the lower extremity of jetting head 17, shear pin 32 rests on bearing surface 42a. In other words, the distance between bearing surface 42a and the lower extremity of jetting head 17 is substantially the same distance as that between shear pin 32 and core head 33.

Thus the main jet 51 passes downwardly from the lower extremity of core barrel 26 through core head 33 cutting a substantially vertical hole through the overburden covering the geologic strata to be sampled. Beveled surface 45 displaces part of the overburden upwardly and outwardly to a point where it is contacted by a conical jet 52 thereby cutting the pieces of displaced overburden into small particles which are carried up the hole thus formed much in the manner as drill cuttings are carried out of the drilling hole by means of the circulating drilling fluid in the drilling of an oil well.

Referring now to Figure 8 a cross section of an elevation view of drop weight release mechanism 18 within sampling tube 12 is shown. Drop weight 19 is shown suspended within sampling tube 12 by means of retaining fingers 53. These are hinged at points 54 and the bearing surfaces of fingers 53 are maintained in contact with retainer ring 24 by means of suspension collar 55 which extends downwardly behind the upper extremity of fingers 53. Suspension collar 55 is maintained in this position by spring 56. To release the drop weight a tension is applied to wire release line 22 raising suspension collar 55 and permitting fingers 53 to pivot about points 54 so that the lower ends of fingers 53 move inwardly and disengage themselves from the inner bearing surface of retainer ring 24. Drop weight 19 then drops by gravity past jet fluid inlet 16 and then acts much as a piston with the high pressure jet fluid acting behind it. The drop weight is thus driven against core barrel 26, shearing shear pin 32 and driving corebarrel into the strata to be sampled by means of a single impact.

Referring now to Figure 9 a device is shown in partial cross section by means of which the core barrel and drop weight are recovered from sampling tube 12 after the sample has been taken and the device has been brought to the surface. This device, usually termed a "go-devil" in field practice, consists of cylindrical body portion 57 provided at its upper extremity with a bale 58 by means of which it is raised and lowered through sampling tube 12. The device is further provided with three retractable engaging members 59 spaced 120° apart around the lower portion of body member 57. These are hinged at points 60 and provided with springs 61 which cause the fingers to emerge from slots 62 provided for them in body member 57. A longitudinal drill hole 63 is provided through the center of body member 57 into which is inserted collapsing bar 64. Slot 65 is milled through the wall of body member 57 and collapsing bar 64 is provided with pin 66 riding in slot 65 to limit the longitudinal travel of collapsing bar 64. When collapsing bar 64 is raised springs 61 force fingers 59 outwardly so that they engage the bearing surface of retainer ring 24 in drop weight 19 or groove 30 in core barrel 26 and thus afford a means of raising the drop weight and the core barrel out of sampling tube 12. Upon reaching the surface collapsing bar 64 is depressed against a friction member 67 so that the lower extremity of bar 64 forces the lower extremity of fingers 59 outwardly thus collapsing fingers 59 into slots 62 giving body members 57 a smooth outward appearance, the go-devil then may be withdrawn from the upper extremity of weight 19 or core barrel 26.

The device of the present invention described above is usually from 30 to 50 feet in length and is fabricated with no outward obstructions which could possibly engage with the wall of the hole drilled through the overburden thereby preventing recovery of the device from the hole. The presence of high pressure hose 21 alongside suspension cable 13 materially assists the rising stream of water in keeping the hole open. The rising current of water from the jetting head through the hole in the overburden has been found to successfully prevent the closing in of the overburden around the sampling device. Excellent core samples have been obtained in core sampling operations off the southern California coast line in as much as 150 feet of water and from below as much as 140 feet of sandy overburden. No undue stresses were noticed in removing the device after the core had been taken and it is believed that the process employed in taking the core sample is responsible for the prevention of difficulties which would normally be expected in core sampling underneath such excessive depths of overburden.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for core sampling geologic strata submerged beneath a body of water which comprises an elongated hollow member, a suspension cable connecting said elongated member with a vessel on the surface of a body of water, an inlet connection opening into said elongated member, a hose connecting said inlet connection with a source of high pressure water aboard said vessel, an elongated drop weight suspended within said elongated member, means extending to the surface for releasing the suspended drop weight at will and a core barrel provided with a core-cutting head suspended within said elongated member and below said drop weight.

2. An apparatus for core sampling submerged geologic formations which comprises a hollow elongated member, an upper hollow elongated member detachably connected to said first named elongated member, a suspension cable connecting said upper elongated member with a vessel on the surface of the submerging body of water, a recording means for recording the inclination and the azimuth of the inclination of said elongated member, an elongated drop weight suspended within said elongated member, said drop weight comprising a solid bar of metal provided with a longitudinal opening drilled out of its upper extremity, a retaining ring provided with two bevelled lower surfaces fitted into said opening to permit retrieving said weight from within said hollow elongated member and a plurality of grooves in the external surface of said drop weight adapted to increase the pressure drop of jet fluid flowing through the annular space between said drop weight and said elongated member, means extending to said vessel for releasing said drop weight at will, an inlet opening into said elongated member for the introduction of water at a pressure greater than that of the ambient submerging body of water and adapted to propel said drop weight as a piston through said elongated member, jet means integral with the lower extremity of said elongated member, an elongated core barrel suspended within said elongated member below said drop weight, a core-cutting head attached to the lower end of said core barrel and means for retaining a fixed rotative relation between said core barrel and said recording means.

3. An apparatus according to claim 2 wherein said core barrel is provided at its upper extremity with a hollow driving head, fluid escape ports opening through said driving head into said core barrel, a peripheral groove around the inner surface of said driving head, a longitudinal key fixed in a longitudinal keyway along the length of said core barrel, a shear pin of readily shearable material extending through the wall of said core barrel and said key and projecting beyond the outer surface of said key, a core-cutting head fixed at the lower extremity of said core barrel and provided with core retaining fingers projecting upwardly and inwardly into said core barrel, a core scribing point with an externally flush head extending through the lower extremity of said core barrel wall and through the wall of said core-cutting head and provided with an inwardly projecting point adapted to longitudinally scribe cores received by said barrel, said core-cutting head being provided with an external surface consisting of a double downward inwardly bevelled surface, the lower of said bevelled surfaces making an angle of from 20° to 60° relative to a transverse plane of the lower opening thereof, and the cutting edge comprising a flat surface in the transverse plane of approximately 1/64 of an inch radial width at the intersection of the internal surface of the core-cutting head and said lower bevelled surface.

4. An apparatus for the sampling of submarine geologic strata which comprises a hollow cylindrical sampling tube, an inlet intermediate the ends of said sampling tube for introducing high pressure water, a drop weight suspended above said inlet within said sampling tube, a core barrel provided with a core-cutting head suspended below said inlet within said sampling tube, a suspension means for said sampling tube, and means for releasing said drop weight.

5. An apparatus for obtaining core samples of submarine geologic formations which comprises an elongated hollow cylindrical sampling tube, an upper sampling tube detachably connected to said sampling tube, a suspension cable connecting said upper sampling tube with a vessel on the surface of a marine body of water, a recording means disposed within said upper sampling tube for recording the inclination and the azimuth of the inclination of the sampling tube, an elongated cylindrical drop weight suspended in the upper portion of said sampling tube, means extending to the surface for releasing the suspended drop weight at will, an inlet into said sampling tube disposed below the suspended drop weight for the introduction of water under pressure greater than that of the ambient marine body, jet means integral with the lower extremity of said sampling tube, an elongated cylindrical core barrel suspended above said jet means and below said inlet within said sampling tube, a core cutting head attached to the lower end of said core barrel, and means for retaining a fixed rotative relation between said core barrel and said recording means within said upper sampling tube.

6. An apparatus according to claim 5 in combination with a vessel disposed on the surface of said marine body, a high pressure water pump disposed aboard said vessel, a flexible tube connecting said pump with said inlet on said sampling tube, winch means aboard said vessel for raising and lowering said sampling tube, and a means for exposing a photographic record in said recording means at a predetermined time.

7. An apparatus according to claim 5 wherein said core barrel is provided with an impact head at its upper extremity of larger diameter than said core barrel, a keyway and key extending longitudinally along the outside of said core barrel, said key serving to maintain said core barrel in a fixed known rotative relation to said recording means in said upper sampling tube, and a scoring means for marking the core sample as it is cut from said formations to determine the rotative relation of said core to said core barrel.

8. An apparatus according to claim 7 including a shearable pin passing through the wall of said core barrel and extending through said key and a short distance beyond the outer surface of said key, the extension of said shearable pin contacting a boss projecting from the inner surface of said sampling tube and thereby suspending said core barrel therein.

9. An apparatus according to claim 5 wherein said drop weight is provided with means for increasing the pressure drop of water flowing through the annulus between said drop weight and said sampling tube wall to increase the force of said flow of water acting on said drop weight and the kinetic energy of the dropping weight.

10. An apparatus according to claim 5 wherein said core cutting head is cylindrical with a double downward inwardly bevelled case-hardened alloy steel cutting edge at its lower extremity and provided with a series of inwardly bent core-retaining fingers at its upper extremity.

11. An apparatus according to claim 5 wherein said jet means comprises an outer cylindrical extension of said sampling tube, said extension being provided with a downward outwardly bevelled jetting edge at its lower extremity, a cylindrical section disposed within and spaced from said extension forming an annulus and provided on the outer surface at its lower extremity with a higher upward inwardly bevelled surface spaced from the bevelled surface of said extension continuing said annulus and a lower downward inwardly bevelled surface, a longitudinal keyway disposed within said cylindrical section, a key guide disposed above said retainer, and a boss to engage a shear pin provided on the upper extremity of said cylindrical section.

12. An apparatus according to claim 5 wherein said upper sampling tube consists of a relatively nonmagnetic pipe.

WILLIAM W. RAND.

References Cited in the file of this patent

UNITED STATES PATENTS

| Number | Name | Date |
| --- | --- | --- |
| 1,597,325 | Melcher | Aug. 24, 1926 |
| 2,256,552 | Drake | Sept. 23, 1941 |
| 2,326,435 | Bynum | Aug. 10, 1943 |
| 2,536,303 | Miller | Jan. 2, 1951 |

FOREIGN PATENTS

| Number | Country | Date |
| --- | --- | --- |
| 622,159 | Germany | Nov. 21, 1935 |